(12) United States Patent
Gaertner et al.

(10) Patent No.: US 9,709,053 B2
(45) Date of Patent: *Jul. 18, 2017

(54) PISTON PUMP FOR DELIVERING FLUIDS, AND ASSOCIATED VEHICLE BRAKE SYSTEM

(75) Inventors: Oliver Gaertner, Abstatt (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 1147 days.

This patent is subject to a terminal disclaimer.

(21) Appl. No.: 13/819,742

(22) PCT Filed: Jul. 6, 2011

(86) PCT No.: PCT/EP2011/061403
§ 371 (c)(1),
(2), (4) Date: Jun. 11, 2013

(87) PCT Pub. No.: WO2012/028363
PCT Pub. Date: Mar. 8, 2012

(65) Prior Publication Data
US 2014/0147315 A1 May 29, 2014

(30) Foreign Application Priority Data
Sep. 2, 2010 (DE) .......................... 10 2010 040 157

(51) Int. Cl.
*B60T 17/02* (2006.01)
*F04B 49/22* (2006.01)
(Continued)

(52) U.S. Cl.
CPC .......... *F04B 49/225* (2013.01); *B60T 8/4031* (2013.01); *F04B 1/0421* (2013.01);
(Continued)

(58) Field of Classification Search
CPC .. F04B 53/102; F04B 53/1022; F04B 53/103; F04B 53/1032; F04B 53/1075;
(Continued)

(56) References Cited

U.S. PATENT DOCUMENTS 1,489,912 A * 4/1924 Winkler .................. F04B 37/16
137/493.2
6,171,083 B1 * 1/2001 Schuller ................ B60T 8/4031
417/549
(Continued)

FOREIGN PATENT DOCUMENTS

DE          101 21 674 A1    12/2001
DE    10 2006 027 555 A1    12/2007
(Continued)

OTHER PUBLICATIONS

International Search Report corresponding to PCT Application No. PCT/EP2011/061403, mailed Mar. 7, 2012 (German and English language document) (5 pages).

Primary Examiner — Nathan Zollinger
(74) Attorney, Agent, or Firm — Maginot, Moore & Beck LLP

(57) ABSTRACT

A piston pump for delivering fluids includes a piston, a cylinder element and a pressure chamber which is arranged between an inlet valve and an outlet valve and is closed by a cover, wherein a throttling mechanism for throttling the fluid flow is provided in the fluid flow downstream of the outlet valve, and a vehicle brake system has a piston pump of this type. The throttling mechanism includes a movable annular disc which is guided on the cylinder element and the internal diameter of which is adapted to the external diameter of the cylinder element, wherein the axial travel of the annular disc sets a variable first throttle cross section.

6 Claims, 2 Drawing Sheets

(51) Int. Cl.
*F16K 15/08* (2006.01)
*F16K 15/10* (2006.01)
*F04B 1/04* (2006.01)
*F04B 11/00* (2006.01)
*B60T 8/40* (2006.01)

(52) U.S. Cl.
CPC ........ *F04B 1/0452* (2013.01); *F04B 11/0091* (2013.01); *F16K 15/08* (2013.01); *F16K 15/10* (2013.01); *Y10T 137/7925* (2015.04); *Y10T 137/7929* (2015.04)

(58) Field of Classification Search
CPC .. F04B 39/0027; F04B 11/00; F04B 39/1033; F04B 11/0091; B60T 8/40; B60T 8/4031; B60T 8/4068; B60T 17/02; F16K 15/08; F16K 15/10; Y10T 137/7925; Y10T 137/7929
USPC ....... 417/549, 554, 545, 479, 471, 546, 566, 417/412; 137/112, 512.3, 516.15
See application file for complete search history.

(56) References Cited

U.S. PATENT DOCUMENTS

| | | | |
|---|---|---|---|
| 6,450,787 B1 * | 9/2002 | Risch | B60T 8/4031 417/569 |
| 9,273,673 B2 * | 3/2016 | Fellmeth | B60T 8/4031 |
| 9,303,639 B2 * | 4/2016 | Beling | F04B 1/0404 |
| 9,336,249 B2 * | 5/2016 | Ray | G06F 17/30303 |
| 2014/0030125 A1 * | 1/2014 | Fellmeth | B60T 8/4031 417/437 |
| 2014/0147314 A1 * | 5/2014 | Gaertner | F04B 1/0404 417/437 |
| 2014/0147316 A1 * | 5/2014 | Gaertner | B60T 8/4031 417/441 |
| 2015/0076379 A1 * | 3/2015 | Schuessler | B60T 17/04 251/120 |
| 2016/0102657 A1 * | 4/2016 | Hennig | B60T 8/4031 417/437 |

FOREIGN PATENT DOCUMENTS

| | | |
|---|---|---|
| DE | 10 2008 002 740 A1 | 12/2009 |
| JP | 05087043 A * | 4/1993 |
| WO | 2004/088137 A1 | 10/2004 |

\* cited by examiner

PISTON PUMP FOR DELIVERING FLUIDS, AND ASSOCIATED VEHICLE BRAKE SYSTEM

This application is a 35 U.S.C. §371 National Stage Application of PCT/EP2011/061403, filed on Jul. 6, 2011, which claims the benefit of priority to Serial No. DE 10 2010 040 157.9, filed on Sep. 2, 2010 in Germany, the disclosures of which are incorporated herein by reference in their entirety.

BACKGROUND

The disclosure is based on a piston pump for delivering fluids as described herein. The present disclosure also concerns a vehicle brake system with such a piston pump.

Piston pumps are known from the prior art in various embodiments. For example in vehicle brake systems, frequently radial piston pumps are used with several pumping elements for delivering pressure medium, in which at least one piston can be moved back and forth by means of a cam. Typically these so-called pump elements comprise a piston, a piston running surface often formed as a cylinder, inlet and outlet valves and sealing elements. The valves serve to control the fluid on the pumping movement of the piston. Here the inlet valve serves to prevent the fluid from flowing back into the intake chamber during the compression phase, the outlet valve prevents the fluid from flowing back from the pressure side into the pump interior. Typically these valves are formed as spring-loaded ball valves, wherein the outflow channel for the outlet valve is formed by a so-called outlet valve cover and the pump cylinder, and the outlet valve is accommodated in the outlet valve cover.

Publication DE 10 2008 002 740 A1 describes for example a piston pump to control the brake pressure in a hydraulic vehicle brake system. The piston pump described comprises a pump housing, a receiver bore arranged in the pump housing for the piston pump and a valve cover which closes the receiver pump towards the outside and accommodates an outlet valve and a first and a second channel segment of an outflow channel. The outflow geometry influences the noise behavior of the piston pump and is therefore usually designed with a suitable contraction of the outflow channel which then constitutes a throttle effect.

Publication DE 10 2006 027 555 A1 describes for example a piston pump with reduced noise development. The piston pump described for delivering fluids comprises a piston, a cylinder element and a pressure chamber which is arranged between an inlet valve and an outlet valve and is sealed by a cover, wherein the outlet valve comprises a closing body designed as a ball, a pretension device acting on the closing body and designed as a spiral spring, a base element to support the pretension device and a disk element, and wherein a sealing seat of the outlet valve is arranged on the disk element. Use of the disk element ensures that the component tolerances of various components of the piston pump cannot have a negative effect on the outlet valve, here the installation space for the closing body designed as a ball and the pretension device designed as a spiral spring requires a large space.

SUMMARY

The piston pump according to the disclosure for delivering fluids has in contrast the advantage that the installation space for the throttling means and hence for the piston pump can be minimized.

Embodiments of the present disclosure can advantageously, by means of the sprung annular disk, reduce the internal pressure of the piston pump when the fluid is in a highly viscous state. As a result advantageously the drive power of the pump drive and the load on the force-transmitting components, such as for example bearings, pistons, high-pressure sealing rings etc., are reduced. This can be utilized for cost saving in future constructions with suitable design.

The core of the present disclosure is to arrange the throttling means externally on the piston pump and hence advantageously reduce the necessary installation space of the piston pump. Alternatively the upstream construction space in the piston pump can be used as a damper chamber or an installation space for further damping elements. Here the throttling means comprise an annular disk which is pushed onto the pump cylinder and is guided by the pump cylinder, wherein the axial travel of the annular disk sets a variable first throttle cross section.

The piston pump according to the disclosure for delivering fluids comprises a piston, a cylinder element and a pressure chamber which is arranged between an inlet valve and an outlet valve and is closed by a cover, wherein means for throttling the fluid flow are provided in the fluid flow downstream of the outlet valve. According to the invention the throttling means comprise a movable annular disk which is guided on the cylinder element, the internal diameter of which is adapted to the external diameter of the cylinder element, wherein the axial travel of the annular disk sets a variable first throttle cross section.

The piston pump according to the disclosure can be used for example for delivering pressure medium in a vehicle brake system.

Other measures and refinements allow additional advantageous improvements of the piston pump for delivering fluids, as described herein.

It is particularly advantageous that the annular disk can have at least one opening which fixedly predefines a second throttle cross section. The second throttle cross section can preferably be optimized for a volume flow in a predefined temperature range. The second throttle cross section can for example be optimized for a volume flow in a temperature range from 0° to 120° C. Because of temperature change, the viscosity of the fluid changes and with it the flow resistance at the annular disk. Thus the annular disk is now shifted axially additionally so that via the pretension device, the free cross section can be enlarged or a new free cross section set. As a result the internal pressure of the pump advantageously does not rise, in particular at low temperatures, and other components of the piston pump are not damaged.

In an advantageous embodiment of the piston pump according to the disclosure, for dynamic throttling of the fluid flow which is guided through at least one outflow opening between the cover and the cylinder element, a pretension device presses the annular disk axially against a throttle point arranged on the cover. The pretension device is preferably formed as a spring element, wherein the selected spring properties of the pretension device define the axial travel of the annular disk. Thus the pretension device can be designed for example as a spiral spring and/or a leaf spring and/or a cup spring and/or an undulating ring. Thus a defined spring force presses the annular disk with axial seal at the cover. The spring force is selected here such that a throttle cross section can be set via the axial travel of the annular disk. This dynamic throttling means acts by the ratio of spring force to travel.

In a further advantageous embodiment of the piston pump according to the disclosure, means for supporting the pretension device formed as a spring element are formed as a ring shoulder on the periphery of the cylinder element. The ring shoulder can advantageously easily be implemented by an inward recess on the outer periphery of the cylinder element.

In a further advantageous embodiment of the piston pump according to the disclosure, a face of the cover forms the throttle point.

An embodiment of the disclosure is shown in the drawings and explained in more detail in the description below. In the drawings the same reference numerals designate components or elements which perform the same or similar functions.

DETAILED DESCRIPTION

Figure 1:
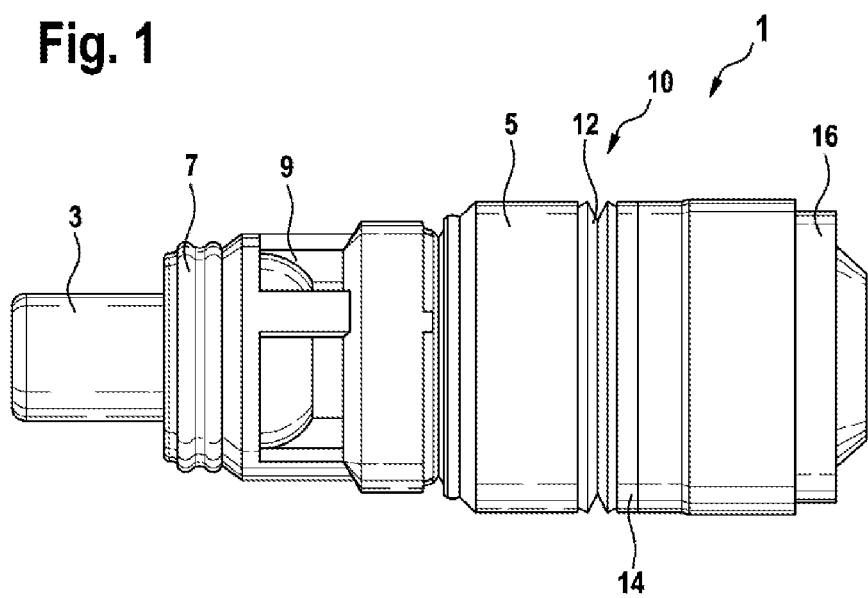
FIG. 1 shows a diagrammatic perspective view of an embodiment example of a piston pump according to the disclosure for delivering fluids.
Figure 2:
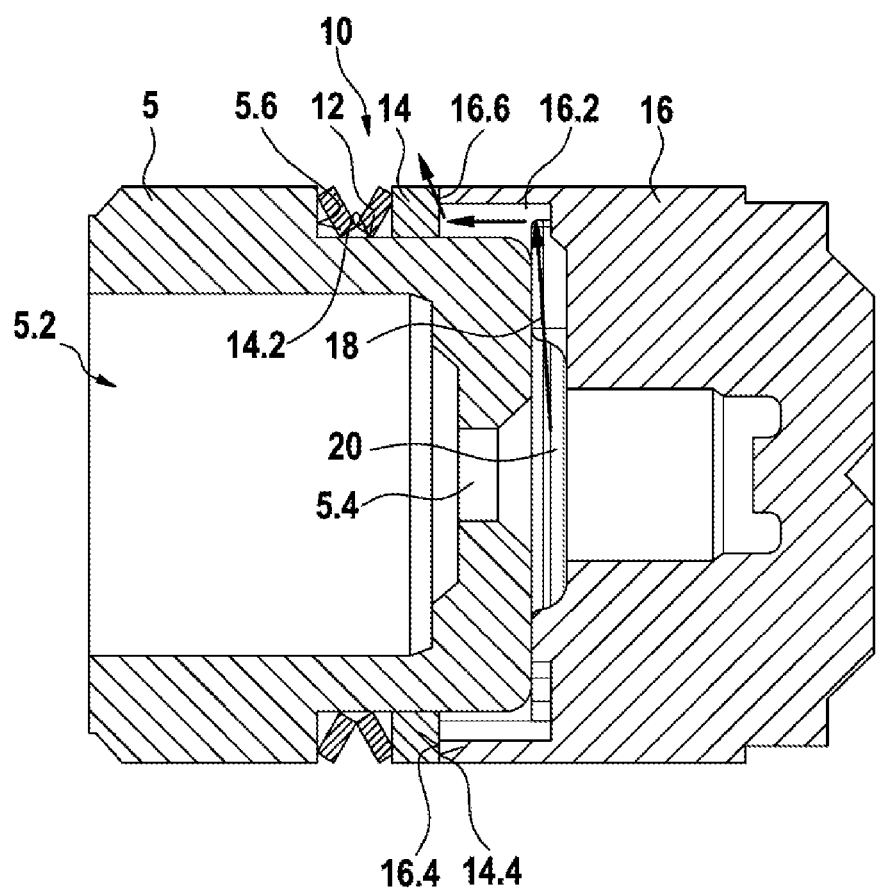
FIG. 2 shows a perspective cross section through a rear region of the piston pump according to the disclosure shown in FIG. 1 for delivering fluids.

As evident from FIGS. 1 and 2, a piston pump 1 according to the disclosure for delivering fluids comprises a piston 3, a cylinder element 5, a sealing element 7 and a fluid filter 9 which are arranged in front of an inlet opening (not visible), behind which is arranged an inlet valve (not visible). Between the inlet valve (not shown) and an outlet valve (not shown), in the interior of the cylinder element 5 is arranged a pressure chamber 5.2 which is closed by a cover 16 in which the outlet valve is arranged. In the depiction only one sealing seat 20 of the outlet valve arranged at an outlet opening 5.4 of the pressure chamber 5.2 is shown. In addition the outlet valve usually comprises a closing body, a pretension device acting on the closing body and means for supporting the pretension device. In the fluid flow 18 downstream of the outlet valve are provided means 10 for throttling the fluid flow 18 in order to reduce the noise formation.

The cover 16 can in the known manner be produced either by material removal or by shaping, wherein from an economic aspect the shaping process is suitable for large quantities. The outflow geometry influences the noise behavior of the piston pump and is therefore formed suitably. In piston pumps known from the prior art, this element is usually a suitable constriction of the outflow channel which then constitutes a throttle effect. This throttle effect creates a hydraulic low-pass filter which has a positive effect on the undesirable noise development. The behavior of the dynamic viscosity of the brake fluid in the range between 0° and 120° C. can be regarded as almost constant and the optimum throttling effect is defined for this temperature range. As a result of the great change in kinematic viscosity of the brake fluid over the required temperature range from −40° to 120° C., the throttle—in particular at low temperatures—stresses the pressure-loaded components of the piston pump and the entire pump drive. Due to the reduced cross section, at lower temperatures a significantly increased fluid friction is indicated which leads to a significant rise in pump internal pressure and results in the stresses mentioned above.

According to the disclosure, the throttling means 10 comprise a movable annular disk 14 guided on the cylinder element 5, the internal diameter of which is adapted to the external diameter of the cylinder element 5. Here the axial travel of the annular disk 14 defines a variable first throttle cross section. The piston pump 1 according to the disclosure shown can for example be arranged in a receiver bore (not shown) of a pump housing or a fluid block. Transverse-running pressure medium channels can open into the receiver bore, through which fluid is guided via the fluid filter 9 to the inlet opening of the piston pump 1 or away from the at least one outflow opening 16.6 of the piston pump 1.

As further evident from FIGS. 1 and 2, for dynamic throttling of the fluid flow 18 guided through the at least one outflow opening 16.6 between the cover 16 and cylinder element 5, a pretension device 12 presses the annular disk 14 against a throttle point 16.4 arranged in the cover 16. In the embodiment example shown, the pretension device 12 is formed as a cup spring. Alternatively the pretension device 12 can be designed as a spiral spring and/or leaf spring and/or undulating ring. The fluid can be guided via several fluid channels 16.2 from the outlet valve seat 20 to the outflow opening 16.6 when the outlet valve is opened.

As further evident from FIG. 2, the annular disk 14 is guided over a guide face 14.2 of the cylinder element 5 and in the initial state of the pretension device 12 is pressed axially with a sealing face 14.4 against the throttle point 16.4 on the cover 16, which in the embodiment example shown is formed by a face of the cover 16. The axial travel of the annular disk 14 is defined by the selected spring properties of the pretension device 12. Furthermore means 5.6 for supporting the pretension device 12 formed as a spring element in the embodiment example shown are formed as a ring shoulder on the periphery of the cylinder element 5.

In addition the annular disk 14 can have at least one opening which fixedly predefines a second throttle cross section. The second throttle cross section can be optimized for a volume flow in a predefined temperature range. Thus the second throttle cross section can for example be optimized for a volume flow in a temperature range from 0° to 120° C. Because of temperature change, the viscosity of the fluid also changes and hence the flow resistance at the second fixedly predefined throttle cross section of the annular disk 14. Thus the annular disk 14 is now displaced additionally axially so that via the pretension device 12, the free cross section can be enlarged or a new free cross section set. As a result the internal pressure of the piston pump 1 advantageously does not rise, in particular at low temperatures, so that other components of the piston pump 1 are not damaged.

Embodiments of the present disclosure advantageously allow optimum use of the construction space and excellent NVH behavior. By means of the sprung annular disk, the internal pressure of the piston pump can advantageously be reduced when the fluid is in a highly viscous state. As a result the drive power and the load on the force-transmitting components such as bearings, pistons, high pressure sealing rings etc. are reduced. This can be utilized for cost saving in future constructions with suitable design.

The invention claimed is:
1. A piston pump for delivering fluids, comprising:
   a piston;
   a cylinder element in which the piston is operable;
   a pressure chamber defined in the cylinder element and
      arranged between an inlet valve and an outlet valve;

a cover arranged at an end portion of the cylinder element so as to close the pressure chamber; and a throttling mechanism configured to throttle a fluid flow, the throttling mechanism being provided in the fluid flow downstream of the outlet valve, wherein the throttling mechanism includes a movable annular disk guided so as to move axially on the cylinder element, wherein an internal diameter of the movable annular disk is adapted to an external diameter of the cylinder element, and wherein an axial travel of the annular disk sets a variable first throttle cross section, and wherein the piston pump further comprises a pretension device configured to dynamically throttle the fluid flow which is guided through at least one outflow opening between the cover and the cylinder element by pressing the annular disk axially against a throttle point arranged on the cover.

2. The piston pump as claimed in claim 1, wherein the pretension device includes a spring element, which defines the axial travel of the annular disk.

3. The piston pump as claimed in claim 1, wherein the pretension device includes one of a spiral spring, a leaf spring, a cup spring, and an undulating ring.

4. The piston pump as claimed in claim 2, further comprising:

a ring shoulder structure defined in the exterior surface of the cylinder element and configured to support the pretension device.

5. The piston pump as claimed in claim 1, wherein a face of the cover forms the throttle point.

6. A vehicle brake system comprising:

at least one piston pump including: (i) a piston; (ii) a cylinder element in which the piston is operable; (iii) a pressure chamber arranged between an inlet valve and an outlet valve; (iv) a cover arranged at an end portion of the cylinder element so as to close the pressure chamber; and (v) a throttling mechanism configured to throttle a fluid flow, the throttling mechanism being provided in the fluid flow downstream of the outlet valve, wherein the throttling mechanism includes a movable annular disk guided so as to move axially on an outer circumferential surface of the cylinder element, wherein an internal diameter of the movable annular disk is adapted to an external diameter of the outer circumferential surface, wherein an axial travel of the annular disk sets a variable first throttle cross section, and wherein the piston pump further comprises a pretension device configured to dynamically throttle the fluid flow which is guided through at least one outflow opening between the cover and the cylinder element by pressing the annular disk axially against a throttle point arranged on the cover.

* * * * *